E. R. FRANKLIN & S. F. FEAVEL.
WAGON-SEAT SPRING-BAR FASTENING.

No. 193,812. Patented Aug. 7, 1877.

Witnesses:
F. Barritt
Edwin B. Jennings

Inventors
Edward R. Franklin.
Stephen F. Feavel.
Per Henry Gerner.
Atty.

UNITED STATES PATENT OFFICE.

EDWARD R. FRANKLIN AND STEPHEN F. FEAVEL, OF SHIOCTON, WISCONSIN.

IMPROVEMENT IN WAGON-SEAT SPRING-BAR FASTENINGS.

Specification forming part of Letters Patent No. 193,812, dated August 7, 1877; application filed May 1, 1877.

*To all whom it may concern:*

Be it known that we, EDWARD R. FRANKLIN and STEPHEN F. FEAVEL, of Shiocton, Outagamie county, State of Wisconsin, have invented new and useful Improvements in Fastenings for Spring-Bars for Wagon-Seats; and we hereby declare that the following is a true and exact description of our invention, which will enable others to make and use the same, reference being had to the accompanying drawings, forming a part of this specification, and to the letters and figures of reference marked thereon.

The object of our invention is to provide for fastenings for adjustable wooden spring-bars for wagon-seats, by aid of which such spring-bars may be removed and replaced at will.

Figure 1:
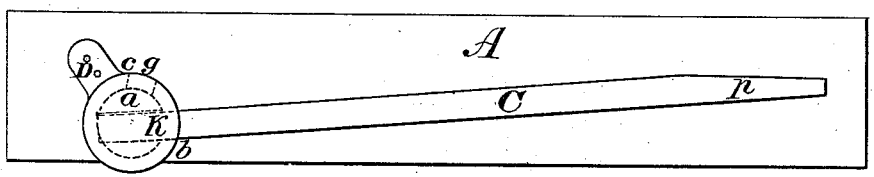
Figure 2:
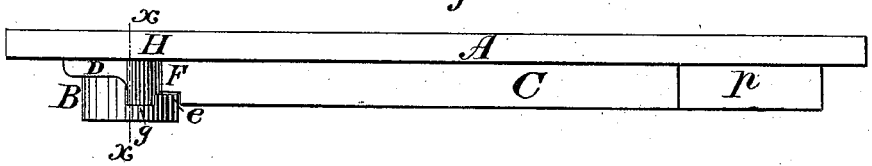
Figure 3:
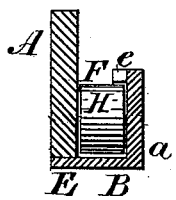
Figure 4:
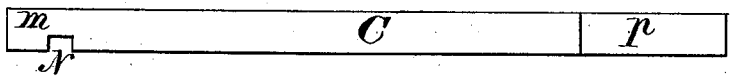

Referring to the drawings, Figure 1 represents a side view of a wagon body or box with a wooden spring-bar attached to the same by means of our improved fastening. Fig. 2 is a plan view. Fig. 3 is a sectional view taken through line $x\,x$ of Fig. 2. Fig. 4 is a detached view of the spring-bar, showing the notch in the end of the same.

A represents the side of a wagon body or box. B represents the casing of the fastening (by preference made of cast-iron) for the spring-bar C. D and E are lugs cast on the casing B, and by aid of which the casing is fastened by screws or rivets to the wagon-body A.

The outer end of the cylindrical casing B is closed by the head $a$, while the inner end of the said cylindrical casing, without any closing, rests against the side of the wagon-body, which thus forms the inner head for the casing.

Between the points $b$ and $c$ is cut the slot or opening F in the side of the cylindrical casing, and into the wall $e$ of this slot is again cut the notch or slot $g$.

In the interior of casing B is placed the roller or hub H, which revolves loosely in the casing. Into the circumference of this roller is mortised the slot K, which extends beyond the center of the roller.

The end $m$ of the spring-bar C is provided with the notch N, the depth of which corresponds with the depth of the slot F in the casing, while the width of the end of the spring-bar corresponds with the slot $g$.

When, therefore, the slot K in the roller H is placed in line with slot $g$ in the casing, the spring-bar can be readily inserted in the fastening, and when depressed in position for the reception of the seat will rest against the wall $e$ of the slot F, and thus be held securely in place without liability to accidental detachment.

It will readily be understood that the seat is to be placed at the end $p$ of the bar C.

Having thus described our invention, we desire to claim—

A spring-bar fastening for wagon-seats, consisting of the casing B, provided with slots F and $g$ and lugs D and E, and containing the roller H, provided with the socket K, in combination with the spring-bar C, having the notch N, substantially as described.

EDWARD R. FRANKLIN.
STEPHEN F. FEAVEL.

Witnesses:
SYLVESTER B. BELDINGS,
EDWARD R. FRANKLIN, Jr.